United States Patent [19]

Nurminen et al.

[11] Patent Number: 5,254,784
[45] Date of Patent: Oct. 19, 1993

[54] METHOD FOR RECOVERING A GASEOUS BORON TRIFLUORIDE BF3 AND THE USAGE OF THE PRODUCT FORMED IN THE METHOD

[75] Inventors: Matti Nurminen; Fredrik Nissfolk; Raimo Linnaila; Vesa-Matti Happonen, all of Porvoo, Finland

[73] Assignee: Neste Oy, Finland

[21] Appl. No.: 811,315

[22] Filed: Dec. 20, 1991

[30] Foreign Application Priority Data

Dec. 21, 1990 [FI] Finland .................................. 906352

[51] Int. Cl.$^5$ .............................................. C07C 2/22
[52] U.S. Cl. ...................................... 585/525; 585/800
[58] Field of Search .............................. 585/525, 800

[56] References Cited

U.S. PATENT DOCUMENTS

| | | | |
|---|---|---|---|
| 4,263,467 | 4/1981 | Madgarker et al. | 585/525 |
| 4,956,512 | 9/1990 | Nissfolk et al. | 585/525 |
| 4,982,042 | 1/1991 | Akatsu et al. | 585/525 |

Primary Examiner—Asok Pal
Attorney, Agent, or Firm—Steinberg & Raskin

[57] ABSTRACT

The invention relates to a method for removing a boron trifluoride from the exhaust gases of a vacuum pump, which gases have been obtained when polymerizing α-olefines by using a BF$_3$-alcohol complex as a catalyst. In a vacuum distillation, the underpressure is achieved by means of a pump sealed with a fluid ring or by means of fluid jet with a torque or ejector pump, possibly assisted by a mechanical blaster, such as a propellant circulating pump. In this pump, the fluid ring or the fluid jet is formed by a cocatalyst forming a complex with the BF$_3$ catalyst, which cocatalyst is an alcohol, preferably butanol.

10 Claims, 4 Drawing Sheets

METHOD FOR RECOVERING A GASEOUS BORON TRIFLUORIDE BF₃ AND THE USAGE OF THE PRODUCT FORMED IN THE METHOD

BACKGROUND OF THE INVENTION

It is well known to prepare poly-α-olefines, which can be used e.g. as a lubricant or as a component thereof, by using a complex of $BF_3$ and a co-catalyst as a catalyst, as described e.g. in U.S. Pat. Nos. 3,780,128 and 4,434,309. A catalyst complex is separated by distillation from the poly-α-olefine to be obtained as a reaction product, and the catalyst complex can thereafter be reused for catalyzing a similar polymerization reaction (see, e.g. FI Patent No. 80 891).

When separating the catalyst complex from the reaction product by distillation, a small portion (less than 10%) of this complex decomposes and the gaseous $BF_3$ is released, causing a chemical loss. Due to this chemical loss, this compound ($BF_3$) which is hazardous to environment, has to be recovered e.g. by means of a washer.

In order to avoid the decomposition of the catalyst complex, the distillation is performed in a reduced pressure, and thereby in a lower temperature. The underpressure can be achieved by means of a fluid ring pump or a torque pump (a fluid ejector pump). Usually, the fluid ring pump, which can be a piston pump, a centrifugal pump, rotary sealed pump etc., is sealed with a fluid ring, wherein the fluid is water or an inert fluid with respect to the gases to be removed. The efficiency of the fluid-ring and/or torque pump may be further increased by placing a mechanical blaster (e.g. a rotary piston pump) in series with said pump.

SUMMARY OF THE INVENTION

The present invention relates to a method for recovering a gaseous boron trifluoride $BF_3$ from the exhaust gases of an underpressure distillation, and to the use of the product formed in the method.

The present invention further relates to a method, by means of which the decomposition of the catalyst complex, i.e. the release of the boron trifluoride $BF_3$, may be further reduced or totally prevented.

The present invention further relates to the removal of a gaseous boron trifluoride from the exhaust gases of a vacuum pump when polymerizing α-olefines by using a boron trifluoridi/alcohol complex as a catalyst.

More particularly, in the method of the present invention the underpressure is caused either by a fluid ring pump or a torque pump, wherein the fluid ring or correspondingly the fluid moments are achieved by means of a complex formed by a liquid $BF_3$ and a $C_1$-$C_{15}$ alcohol, or by means of a fluid jet of this alcohol.

BRIEF DESCRIPTION OF THE DRAWINGS

The following drawings are illustrative of embodiments of the invention and are not meant to limit the scope of the invention as encompassed by the claims.

DETAILED DESCRIPTION

In one embodiment of the present invention, a fluid ring pump is used during the distillation for reducing the pressure, wherein the fluid ring is formed by a $C_1$-$C_{15}$ alcohol to be used as a co-catalyst of a catalytic $BF_3$ and forming complex with $BF_3$. The alcohol used is preferably a relatively short-chained monoalcohol, e.g. butanol.

In another embodiment of the present invention, a torque pump (an ejector pump) is used as a pressure-reducing pump, in which the fluid moment, i.e. in practice the fluid jet, is formed by the fluid jet of the co-catalyst.

The $BF_3$-alcohol complex formed as a product of the method can be reused as a catalyst, preferably when polymerizing poly-α-olefines.

The pressure range in which the pump can be used essentially depends on the requirements related to the distillation. The absolute pressure is usually less than 50 kPa, even 1 kPa. However, the pressure is not a limiting factor, since the method can always be used when it is desirable to pump gases with a fluid ring pump and/or a pump of an ejector type, possibly assisted by a mechanical blaster, in which the gas and the fluid can be intimately mixed with each other. The temperature to be used during the pumping depends on the boiling point (the steam pressure) of the selected alcohol and the cooling mode. The temperature range is generally from about 20° to about 60° C. Either a water or air cooling, or both together, can be used.

In the fluid ring, when the co-catalyst is the substance forming the fluid ring or the substance to be jetted in the fluid jet, the complex between the catalyst, i.e. $BF_3$, and the co-catalyst forms immediately when these materials come into contact with each other in the underpressure pump. The complex formed can be recovered, returned to a reactor and reused as polymerization catalyst.

$BF_3$ and the alcohol which have come into contact with each other form a complex in such a way that all $BF_3$ to be removed binds to the alcohol, whereby the loss and emission of the catalyst into the surrounding atmosphere is totally avoided.

FIGS. 1-7 show different equipment arrangements by which the present invention can be applied.

When separating the catalyst complex from the reaction product, the gaseous components or vacuum gases separating therefrom enter the fluid ring pump or the ejector pump 1 (possibly assisted by a mechanical blaster, e.g. a rotary piston pump), by means of which they are pumped into a separating container 2, from which the pure gases, i.e. those not containing the catalyst, the recovered catalyst complex and the mixture to be circulated, are removed.

The mixture to be circulated is then returned to the pump, for example in a cooled state. This can be accomplished by means of a heat exchanger 3. Alternatively, the cooling can occur after the pump as shown in FIG. 4.

Figure 2:
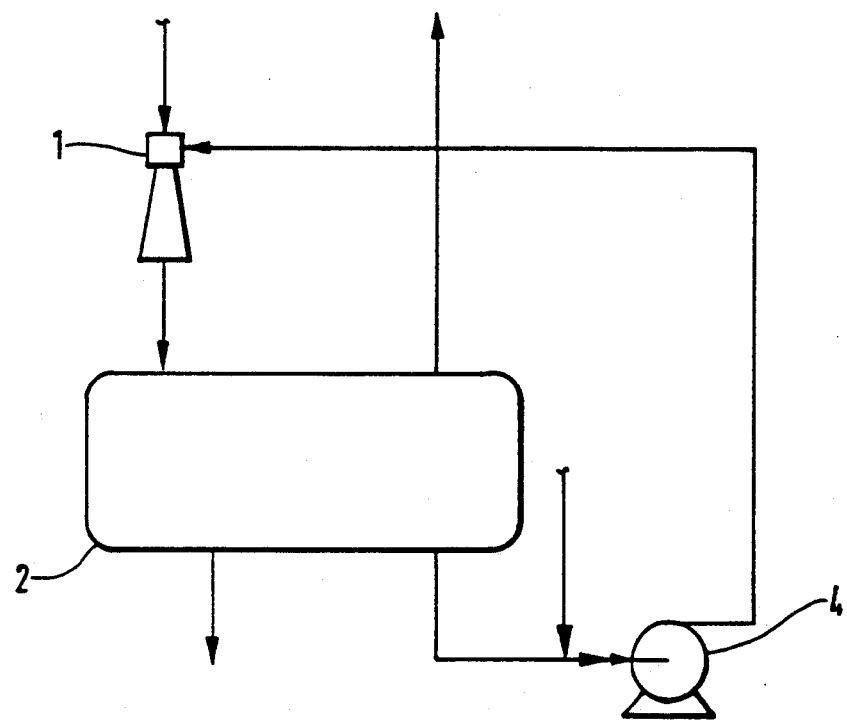
FIG. 2 shows another embodiment of the present invention wherein a torque pump is used in combination with a propellant circulating pump and separating container.
Figure 4:
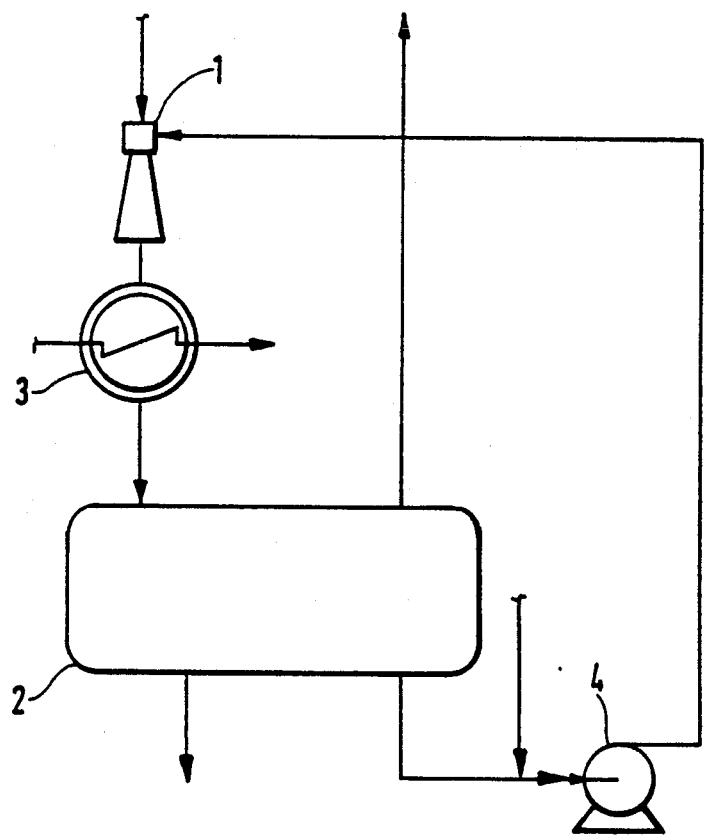
FIG. 4 shows an embodiment of the present invention as illustrated in FIG. 2 wherein a heat exchanger is provided between the torque pump and separating container.
Figure 6:
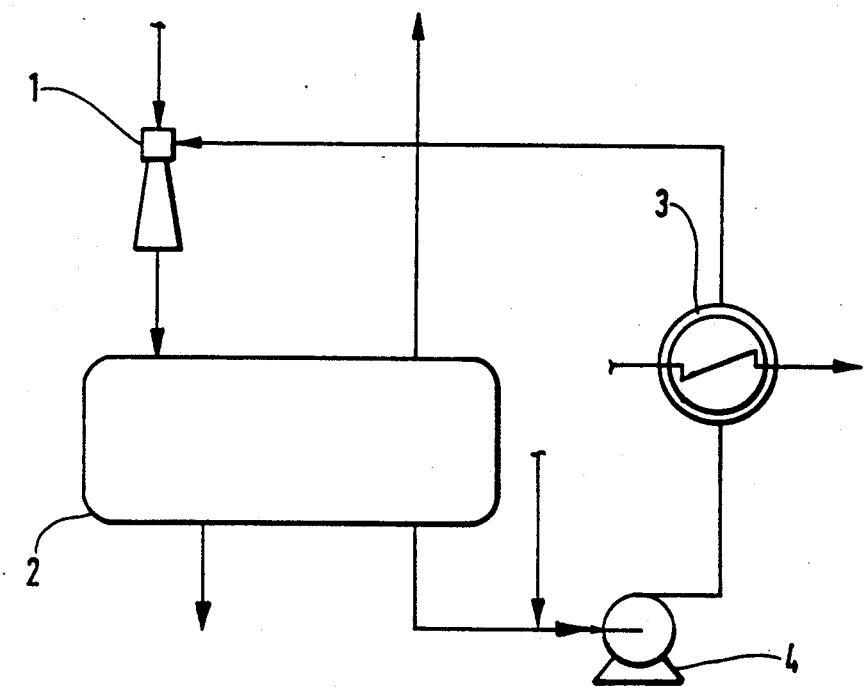
FIG. 6 shows an embodiment as illustrated in FIG. 2 wherein a heat exchanger is provided between the ejector pump and the propellant circulating pump.

If the pump for the vacuum gases is a torque pump, a separate propellant circulating pump 4 is needed, as shown in FIGS. 2, 4 and 6.

Figure 1:
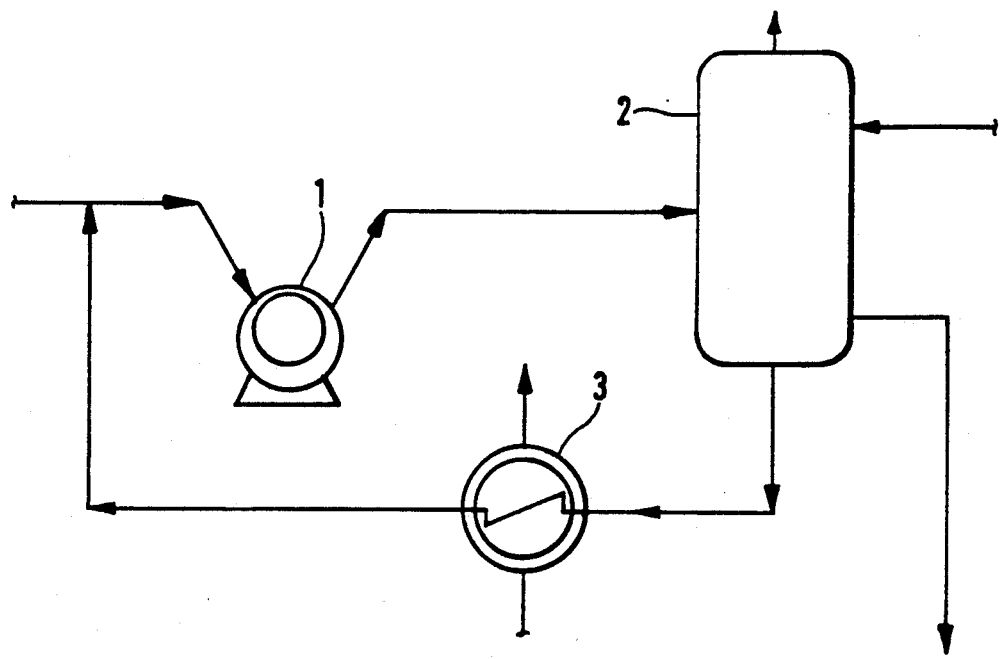
FIG. 1 shows a device used in a method in accordance with the present invention wherein a pump, heat exchanger and separating container are used in the boron recovery process.
Figure 3:
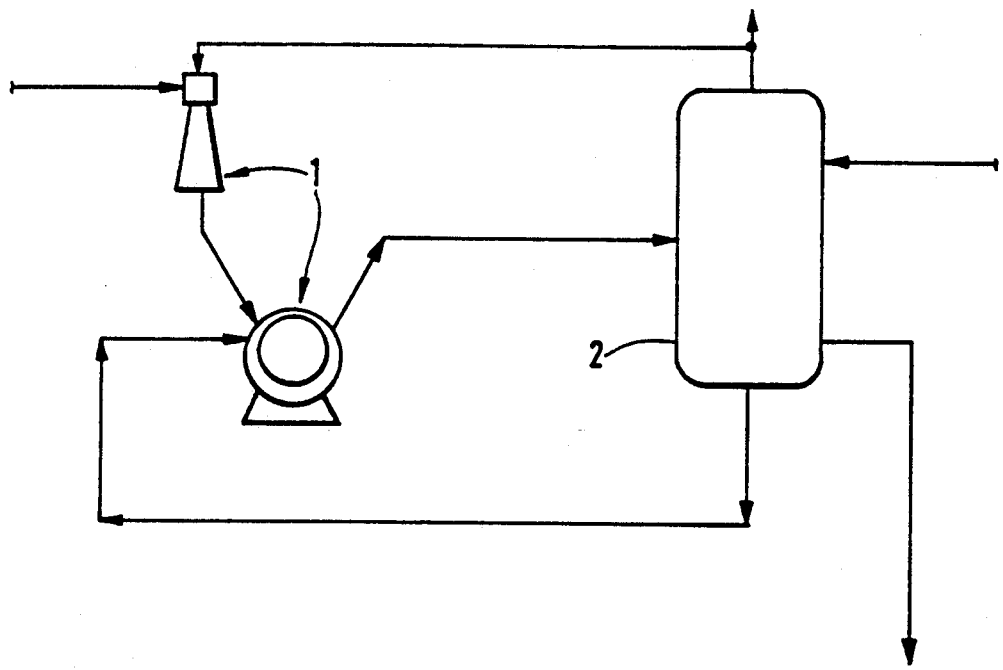
FIG. 3 shows another embodiment of the present invention wherein an ejector pump and a fluid ring pump are placed in a series.
Figure 5:
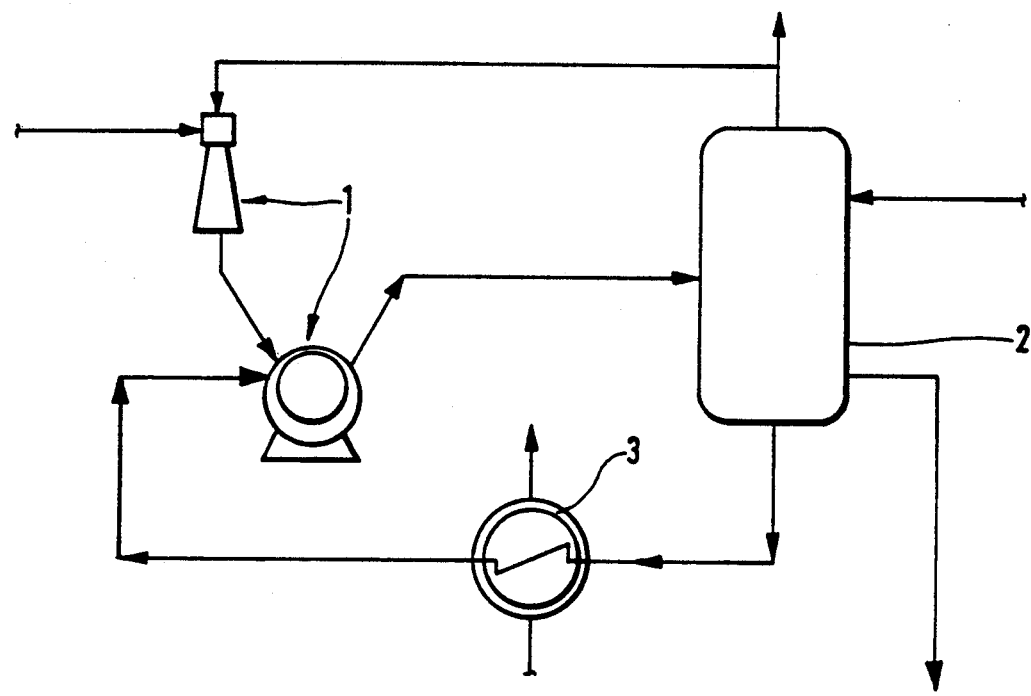
FIG. 5 shows an embodiment of the present invention as illustrated in FIG. 3 wherein a heat exchanger is provided between the ejector pump and the separating container.

The alcohol forming a complex with $BF_3$ and forming the fluid ring of the pump or forming the fluid jet of the ejector pump is added either to the separating container 2, as shown in FIGS. 1, 3 and 5, or just before the separate propellant circulating pump 4, as shown in FIGS. 2, 4 and 6.

It is also possible to use several pumps when desired. As an example, FIG. 3 depicts an arrangement of an ejector and fluid ring pump placed in series.

Figure 7:
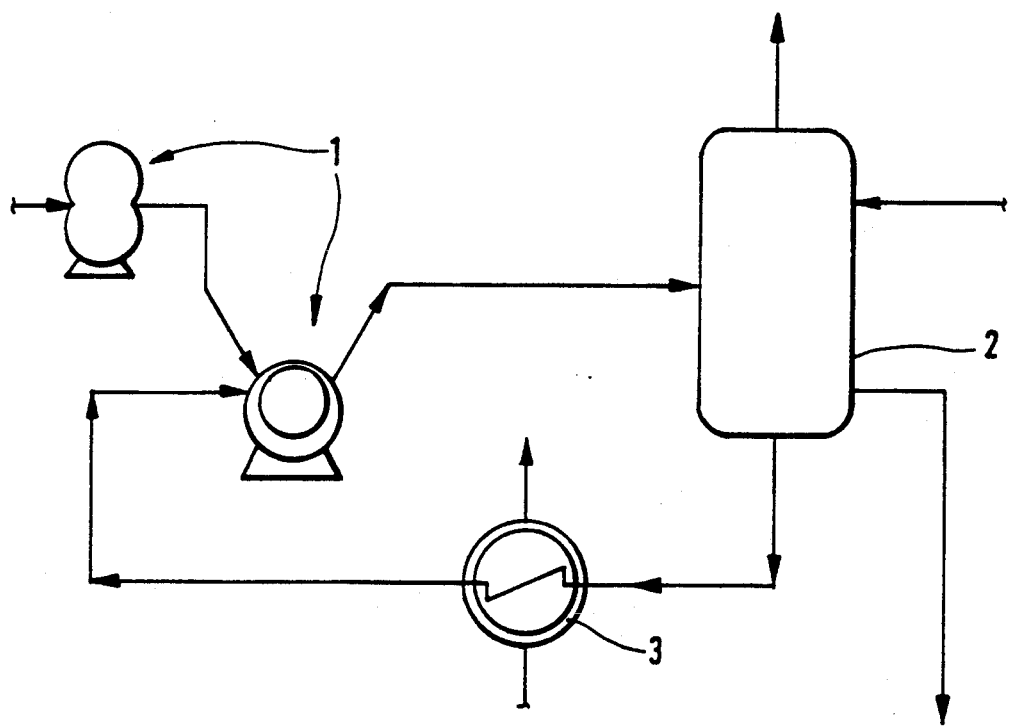
FIG. 7 shows an embodiment of the present invention as illustrated in FIG. 1 wherein a mechanical blaster is arranged in series with a fluid ring pump.

FIG. 7 shows the use of a blaster, e.g. a propellant circulating pump, in series with a fluid ring pump.

What is claimed is:

1. A method for recovering a gaseous boron trifluoride $BF_3$ from the exhaust gases of a sub-atmospheric pressure distillation, comprising the steps of:
   performing a distillation to separate a catalyst complex from a reaction product,
   pumping the gaseous component of the distillation under a sub-atmospheric pressure either by a liquid sealed rotary pump or an ejector pump, and
   achieving a liquid ring in said liquid sealed rotary pump or correspondingly a fluid moment in said ejector pump by means of a complex formed by a liquid $BF_3$ and a $C_1$–$C_{15}$ alcohol or by means of a fluid jet of this alcohol.

2. The method of claim 1, wherein said alcohol forming the complex is butanol.

3. The method of claim 1, further comprising applying the $BF_3$-alcohol complex formed as a product of the method as a catalyst for polymerizing poly-α-olefines.

4. The method of claim 1, further comprising the step of providing a mechanical blaster in series with said liquid sealed rotary pump.

5. The method of claim 1, further comprising the step of directing the gaseous components of the distillation into said liquid sealed pump or said ejector pump by means of a mechanical blaster.

6. The method of claim 1, wherein the gaseous components are pumped from said liquid sealed pump or said ejector pump into a separating container, further comprising removing the pure gases formed in said separating container.

7. The method of claim 1, wherein said ejector pump is used and further comprising the step of providing a propellant circulating pump.

8. The method of claim 1, wherein a reaction is produced by means of the contact between the alcohol of said liquid sealed pump or said ejector pump and the gaseous component of the distillation in said liquid sealed pump or said ejector pump.

9. The method of claim 1, wherein said ejector pump is used and ejects the alcohol into contact with the gaseous component of the distillation.

10. An improved method for preparing poly-α-olefines utilizing a catalyst complex of $BF_3$ and a cocatalyst, by means of which the release of boron trifluoride $BF_3$ obtained from the decomposition of the catalyst complex is substantially prevented, the improvement comprising the steps of:
   separating the catalyst complex from the poly-α-olefin thereby obtained by distillation,
   pumping the gaseous products of the distillation under a sub-atmospheric pressure achieved by means of a liquid sealed rotary pump or an ejector pump, and
   achieving a liquid ring in said liquid sealed rotary pump or correspondingly fluid moments in said ejector pump by means of a complex formed by a liquid $BF_3$ and a $C_1$–$C_{15}$ alcohol or by means of a fluid jet of said alcohol, and
   reusing the $BF_3$ - alcohol complex formed as a catalyst.

* * * * *